US008601440B2

(12) United States Patent
Massey et al.

(10) Patent No.: US 8,601,440 B2
(45) Date of Patent: Dec. 3, 2013

(54) USING WEB MODEL FEEDS TO VERSION MODELS WHICH ARE DEFINED IN MODELING LANGUAGES

(75) Inventors: Dan Massey, Redmond, WA (US); Mark Groves, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 823 days.

(21) Appl. No.: 12/615,612

(22) Filed: Nov. 10, 2009

(65) Prior Publication Data

US 2011/0113359 A1 May 12, 2011

(51) Int. Cl.
*G06F 9/44* (2006.01)

(52) U.S. Cl.
USPC ............................................. 717/122

(58) Field of Classification Search
USPC ............................................. 717/122
See application file for complete search history.

(56) References Cited

U.S. PATENT DOCUMENTS

| 7,322,025 | B2 * | 1/2008 | Reddy et al. | 717/121 |
| 7,433,876 | B2 | 10/2008 | Spivack et al. | |
| 8,266,173 | B1 * | 9/2012 | Reztlaff et al. | 707/780 |
| 8,326,777 | B2 * | 12/2012 | Zhang et al. | 706/12 |
| 8,341,513 | B1 * | 12/2012 | Lattyak et al. | 715/229 |
| 8,352,397 | B2 * | 1/2013 | Rubin et al. | 706/45 |
| 2003/0204835 | A1 * | 10/2003 | Budhiraja et al. | 717/120 |
| 2004/0107414 | A1 * | 6/2004 | Bronicki et al. | 717/105 |
| 2006/0173985 | A1 | 8/2006 | Moore | |
| 2006/0288011 | A1 * | 12/2006 | Gandhi et al. | 707/10 |
| 2007/0100900 | A1 * | 5/2007 | Gibbins | 707/201 |
| 2007/0214126 | A1 | 9/2007 | Kikinis | |
| 2008/0005086 | A1 | 1/2008 | Moore | |
| 2009/0019063 | A1 | 1/2009 | Gandhi et al. | |
| 2010/0057680 | A1 * | 3/2010 | Little | 707/3 |
| 2010/0088676 | A1 * | 4/2010 | Yuan et al. | 717/120 |
| 2010/0274889 | A1 * | 10/2010 | Carter et al. | 709/224 |

FOREIGN PATENT DOCUMENTS

WO WO2008113425 A1 * 1/2008 ............. G06F 17/30

OTHER PUBLICATIONS

Edwards et al. "An Adaptive Model for Optimizing Performance of an Incremental Web Crawler", May 2001, ACM.*
Jun, et al. , "FeedEx: Collaborative Exchange of News Feeds.", Retrieved at <<http://www.ra.ethz.ch/cdstore/www2006/devel-www2006.ecs.soton.ac.uk/programme/files/pdf/2025.pdf>>, May 23-26, 2006, pp. 10.

(Continued)

*Primary Examiner* — Anna Deng
*Assistant Examiner* — Junchun Wu
(74) *Attorney, Agent, or Firm* — Ogilvie Law Firm

(57) ABSTRACT

Versions of a model in UML or another modeling language can be published on web feeds, such as RSS or Atom web feeds. A model feed includes a sequence of incremental differences to a base version of a model; the base version can be an empty model or a snapshot of another model feed, for example. Stream charts show the relationship between model feeds. A selected sequence of incremental differences can be applied, in forward or reverse, to animate changes in a model. A developer working on a different computer than another developer can create new model versions which use some elements from a published feed and other elements introduced by the local developer. New model versions and semantic information about the sequence taken to reach them can be shared through web feeds.

20 Claims, 4 Drawing Sheets

(56) References Cited

OTHER PUBLICATIONS

Lin, et al., "An Easy-To-Use Feed Middleware for Application Development with RSS/Atom Feeds.", Retrieved at <<http://ieeexplore.ieee.org/stamp/stamp.jsp?arnumber=04420319>>, International Conference on Convergence Information Technology, 2007, pp. 567-572.

Dang, et al., "Improving Community Awareness in Software Forges by Semantical Aggregation of Tools Feeds.", Retrieved at <<http://flosshub.org/system/files/Paper4.pdf>>, Sep. 2008, pp. 6.

Recker, et al., "A Semantic Wiki for Continual Collaborative Information Management.", Retrieved at <<http://www.hpl.hp.com/techreports/2008/HPL-2008-90.pdf>>, Apr. 21-25, 2008, pp. 9.

"MOF 2.0/XMI Mapping, Version 2.1.1", Retrieved at <<http://www.omg.org/docs/formal/07-12-01.pdf>>, Dec. 2007, pp. 120.

Nottingham, et al., "The Atom Syndication Format", Retrieved at <<http://www.ietf.org/rfc/rfc4287>>, Dec. 2005, pp. 38.

Gregorio, et al., "The Atom Publishing Protocol", Retrieved at <<http://www.ietf.org/rfc/rfc5023.txt>>, Oct. 2007, pp. 47.

Snell, J., "Atom Threading Extensions", Retrieved at <<http://tools.ietf.org/html/rfc4685>>, Sep. 2006, pp. 13.

"RSS 2.0 Specification", Retrieved at <<http://www.rssboard.org/rss-specification>>, Mar. 30, 2009, pp. 7.

Ozzie, et al., "FeedSync Specification v1.0.1", Retrieved at <<http://dev.live.com/feedsync/spec/spec.aspx>>, Sep. 15, 2008, pp. 17.

"About Google Wave", Retrieved at <<http://wave.google.com/help/wave/about.html>>, Sep. 26, 2009, pp. 2.

Dreiling, et al., "Gravity—Collaborative Business Process Modelling within Google Wave", Retrieved at <<http://www.sdn.sap.com/irj/scn/weblogs?blog=/pub/wlg/15618>>, Sep. 26, 2009, pp. 2.

Kersten, "Tasktop 1.4 and Eclipse Mylyn 3.1 released", Retrieved at <<http://tasktop.com/blog/eclipse/tasktop-14-and-eclipse-mylyn-31-released>>, Sep. 26, 2009, pp. 5.

"ICONIX / Sparx Enterprise Architect for Power Users", Retrieved at <<http://www.iconixsw.com/EA/PowerUsers.html>>, Nov. 10, 2009, pp. 7.

"Sterling Software arms COOL:Jex with new support for complex, team-based object-oriented modeling", Retrieved at <<http://ww2.itweb.co.za/office/bytes/981110125.htm>>, Nov. 10, 2009, pp. 2.

* cited by examiner

USING WEB MODEL FEEDS TO VERSION MODELS WHICH ARE DEFINED IN MODELING LANGUAGES

BACKGROUND

Documents, software, and other information stored in computer-readable form is often subject to revision, resulting in multiple versions of a given file or set of files. During software development, for example, different members of a development team may each create their own versions of code and their own model versions. Creating alternate versions facilitates exploration of possible solutions, but also opens a door to inconsistencies, accidental omissions, and inefficient duplication.

Accordingly, a variety of revision management tools have been created. Such tools may also be referred to as tools for revision control, version control, source control, source code management, content management, and/or document management, for example. Some revision control tools are standalone applications, while others are integrated into familiar applications such as word processors. In some situations, careful adherence to a set of rules for coordinating document changes with other team members could be used without any specialized tools for version control. However, the more team members, different versions, and impending deadlines are involved, the more likely it is that some kind of automated tool can be helpful.

SUMMARY

To facilitate cooperation among developers, versions of a model can be published on web feeds, such as RSS or Atom web feeds. Developers working on respective computers can create new model versions which use some elements from a published feed and other elements introduced by the respective developer. New versions can then be shared through web feeds.

Some embodiments configure memory with a model feed which includes a sequence of incremental differences corresponding to respective model versions. A display may show a visual representation of the model feed and its relation to other model feeds; a given model feed may reference a model snapshot feed and/or another model feed. A display may also show a model diagram derived from the model feed, visually representing elements with their relationships and/or dependencies in one or more of the model versions.

A user can cause element-based operations on the model feed, such as adding an element, deleting an element, replacing one element with another element, moving an element, or renaming an element. A user can also cause feed-based operations, such as publishing a model feed, subscribing to a model feed, taking a snapshot of a model feed, branching (creating a child of a model feed), merging model feeds, and replaying (forward or backward) incremental differences in a model feed while watching corresponding changes in a displayed model diagram, for example.

Model feed relationships vary. For example, one model feed can be a child of another model feed, two model feeds can each refer to the same snapshot feed, and a model feed can be merged in that it includes incremental differences from at least two other model feeds. A developer may read multiple different model feeds which represent different versions of a single model, and then select specific versions of elements within the model to carry forward.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
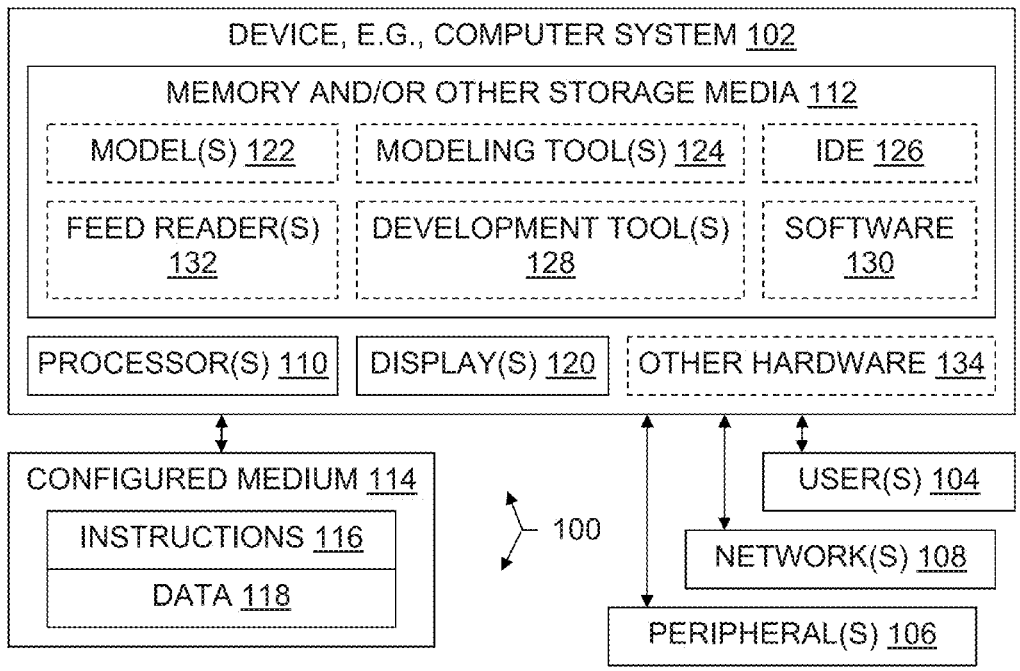
FIG. 1 is a block diagram illustrating a computer system having at least one processor and at least one memory, in an operating environment which may be present on multiple network nodes, and also illustrating configured storage medium embodiments.

Models are assets which can be versioned. However, versioning can be done in various ways, and version control approaches that work with other types of content do not necessarily work well with models. Although file-based versioning is widely and beneficially used, file-based versioning can complicate collaboration over models because merge conflicts sometimes require hand editing of complex files containing XML or other representations of the models. Some modeling tools require manual management of multiple files that must be versioned together to maintain model integrity. Some modeling tools support repository based versioning and XMI import/export. Some modeling tools provide model-model and model-XMI diff capabilities. Some modeling tools provide package level or element level versioning.

However, it has become apparent to the inventors that many modeling tools are not good at maintaining multiple related options and fail to adequately support collapsing alternatives after those alternatives have been sufficiently explored. These shortcomings exist even though one of the recognized best practices in modeling is to explore alternatives, and refactoring operations are common during software design.

It has also become apparent that in order to facilitate development, a modeling tool could maintain the semantics of the change history, not merely the result of the changes. A developer would benefit from knowing, for example, that a name changed, rather than merely seeing that one component disappeared and a similar component appeared. Microsoft's Visual Studio® Team System Database Edition (a.k.a. Development Edition) supports "preservation of intent" for schema changes, so that tools applying the changes can select the correct operation to apply for each change.

As development becomes ever more distributed, teams can benefit from better collaboration and tools for sharing designs and requirements captured in models. Using some embodiments described herein, models can be versioned, branched and shared using web feeds (e.g., Atom, RSS 2) of model differences. Modelers can use semantically aware versioning that supports multiple alternatives (branches) and merging alternative versions. Some embodiments provide the ability to take changes from alternative version streams even when renamed elements are involved. In addition, embodiments support real-time collaboration and off-line use.

Some embodiments provide semantically aware model versioning. Some provide semantically aware model branching, with a "merge memory" capability for merging model versions via rename/mapping records. Some embodiments provide model snapshots for performance and easy reference. In some embodiments, web feeds provide a natural off-line model. A feed model can support single user versioning, sync-point collaboration, and real-time collaboration in some embodiments. In some embodiments, the feed model easily extends to diagrams, and in some, a developer can use the difference ("diff") feeds to drive a model animation. Other sequence containers could also be used, rather than (or in addition to) using web feeds.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

"Model" means a description defined in a modeling language. A model includes one or more versions, each of which is captured in tangible form, e.g., in a computer-readable storage medium configured with expressions in the modeling language.

A "modeling language" is an artificial language used to express information in a structure defined by a set of rules which guide interpretation of the meaning of the structure's components. Modeling languages may be primarily textual, primarily graphical, or a mixture of text and graphics. Unified Modeling Language (UML) is a widely used general-purpose modeling language. Other modeling languages may provide capabilities not found in UML, such as data flow diagrams.

Throughout this document, use of the optional plural "(s)" means that one or more of the indicated feature is present. For example, "web feed(s)" means "one or more web feeds" or equivalently "at least one web feed".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. The media 112 may be volatile memory, non-volatile memory, fixed in place media, removable media, magnetic media, optical media, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104. Media 112 may be of different physical types. An operating environment may also include other hardware 134, such as buses, power supplies, and accelerators, for instance.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., by modeling, model animation, model element-based operations, model feed-based operations, and/or other operations.

In some embodiments, display(s) are part of the system 102. Displays can show modeling language text/graphics, model diagrams, source code, natural language communications such as email, and user interfaces for various programs. In particular, some embodiments include one or more models 122 created by familiar modeling tools 124, stored in files on a network or local hard drive. The modeling tools may be part of an integrated development environment. Text editors, compilers, debuggers, and other development tools 128 may be present, as part of an integrated development environment or as separate applications. Other software 130 may also be present, such as email managers, database managers, spreadsheets, and so on. In particular, software 130 may include a web browser and web feed reader(s) 132. Web feed readers, also known as aggregators, regularly check a website to which a person has subscribed for news or other publications, and automatically download available updates from a feed on the site. Moreover, the modeling environment itself may be a web-based application, in addition to the presence of web-based feeds.

A given operating environment 100 may include an Integrated Development Environment (IDE) 126 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use UML or other modeling languages.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
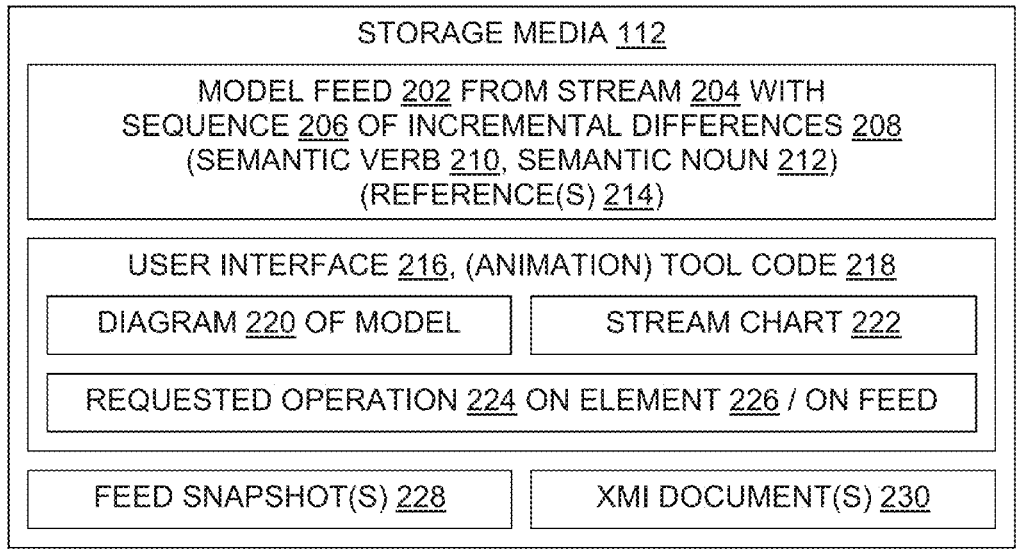
FIG. 2 is a block flow diagram illustrating a model feed in an example architecture.

FIG. 2 illustrates an architecture which is suitable for use with some embodiments. A model feed 202 from a stream 204 that can feed multiple systems 102 provides a sequence 206 of incremental differences 208. The incremental difference(s) correspond to change(s) made in an underlying model version. At root, each sequence 206 has an empty model, or another properly defined model, so that applying the incremental differences in order creates a sequence of new versions of the model. In some embodiments, an incremental difference may be applied only in a forward direction, whereas in other embodiments at least some incremental differences can be applied in either a forward direction or a reverse (a.k.a., "undo") direction. A given incremental difference may include semantic verb(s) 210 (e.g., add, delete, replace, move, rename) and/or semantic noun(s) 212 (e.g., class, method, package, state, component, etc.). The sequence 206 may include reference(s) 214 to other sequences 206 and/or to snapshot(s) 228 of other models from which element(s) are incorporated into the present sequence. Incremental differences may be implemented in any rigorous formal language that accurately captures differences between model versions; some embodiments employ XMI documents 230.

As FIG. 2 also shows, an architecture may include user interface(s) and other tool code 218 to allow users to request operations on model versions. Familiar user interface mechanisms can be employed. Through the interface, a user may for instance view a diagram 220 of a selected version of a model 122, view a stream chart 222 illustrating graphically how a selected model version relates to other model versions, and/or request operations 224 on individual model element(s) 226 and/or on model feed(s) 202.

With reference to FIGS. 1 and 2, some embodiments provide a computer system 102 with a logical processor 110 and a memory medium 112 configured by circuitry, firmware, and/or software to transform a sequence of incremental differences into a version of a model, to manipulate the model and/or the sequence, and/or to provide other functionality as described herein. The memory is in operable communication with the logical processor. A model feed 202 residing in the memory has a sequence 206 of incremental differences 208 corresponding to respective model 122 versions. A display 120 is configured with a model diagram 220 visually representing model elements with their relationships and/or dependencies in at least one of the model versions. For example, UML diagrams are one type of model diagram 220. In some embodiments, a model snapshot 228 feed 202 includes an XMI document 230 representing a snapshot of at least one of the model versions. For example, a snapshot feed document is recited in the Additional Examples section below; the example is titled "My Components", and it has a Base Model entry and three other entries.

Figure 4:
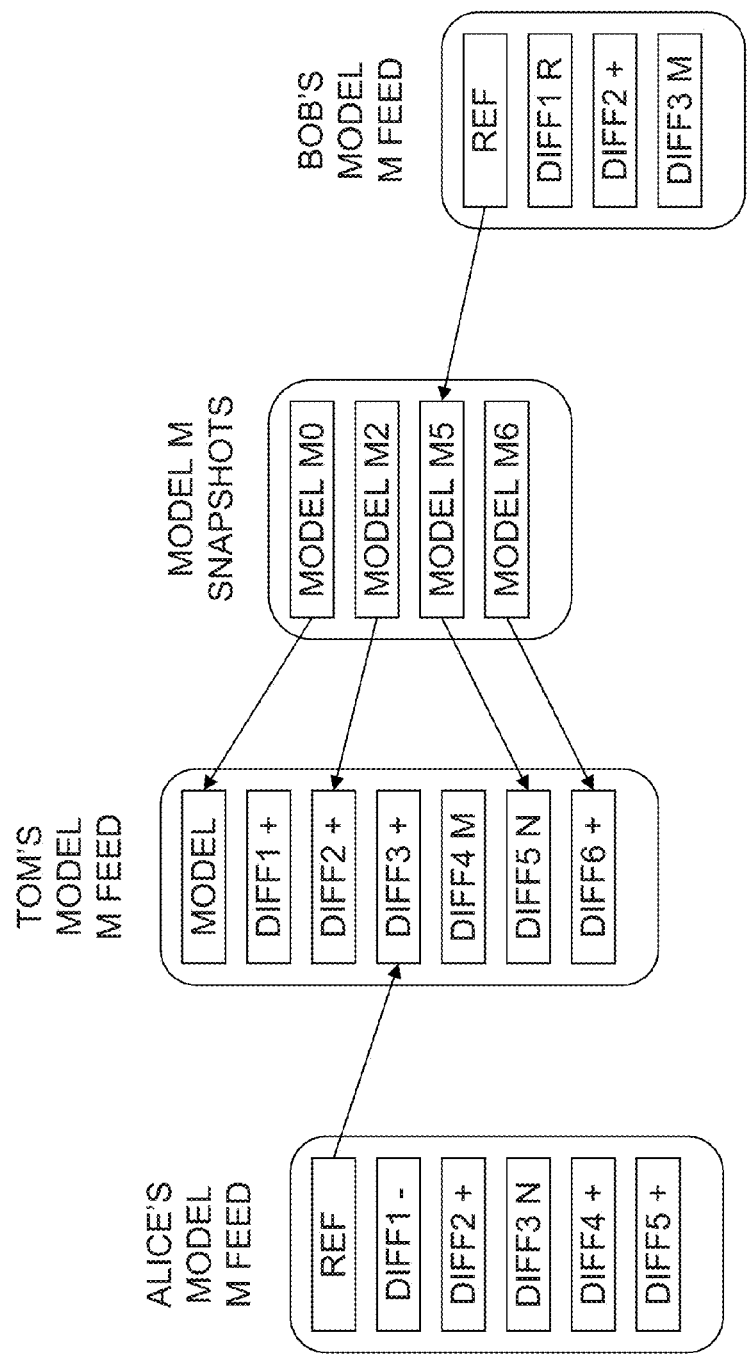
FIG. 4 is an example of stream charts that are provided in some embodiments.
Figure 5:
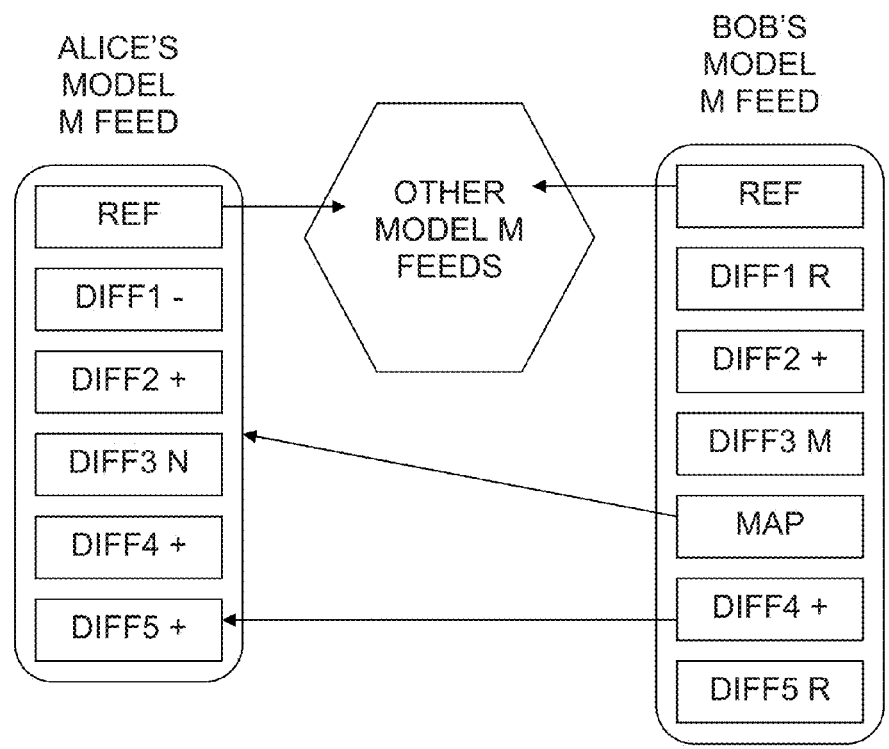
FIG. 5 is another example of a stream chart.
Figure 6:
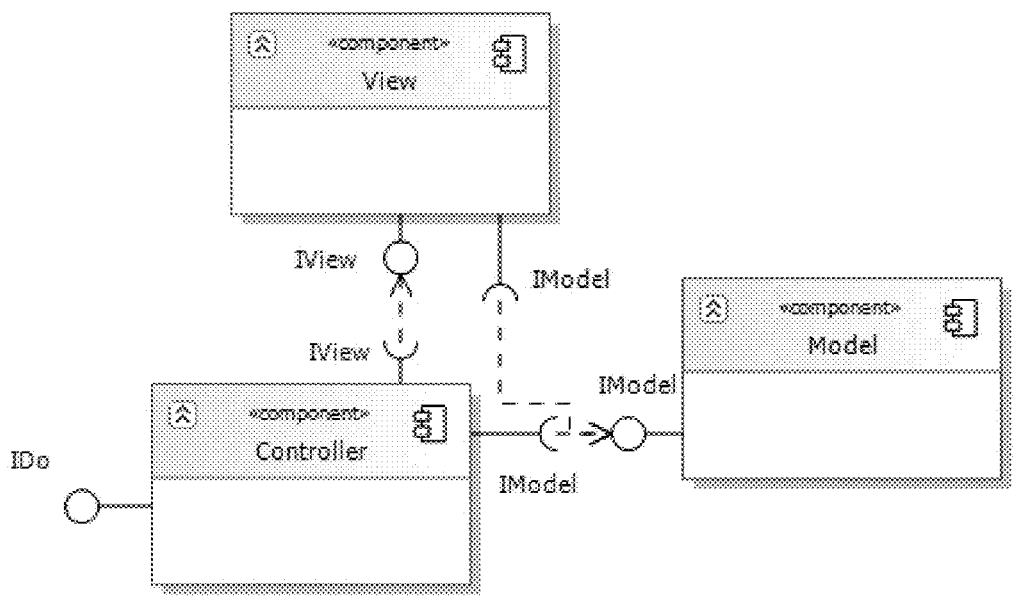
FIG. 6 is an example of model diagrams that are provided in some embodiments.

In some embodiments, the display is configured with a stream chart 222 which visually represents individual incremental differences in model feed(s). A stream chart generally illustrates relationships between model feeds, whereas a model diagram illustrates relationships between modeled components such as classes, methods, and/or UML elements. A stream chart may visually represent reference(s) 214 in one model feed to another model feed, for instance. Stream charts may be referred to elsewhere as branch visualizations. FIGS. 4 and 5 show stream charts, which are discussed further below, while FIG. 6 shows a model diagram 220 (specifically, a UML diagram).

In some embodiments, a system includes a plurality of computers 102. Each computer has a logical processor 110 and also has a memory medium 112 that is in operable communication with the logical processor and is configured by a model feed 202 that includes a sequence 206 of incremental differences 208 corresponding to respective model versions. In some embodiments, a model feed on at least one of the computers references a model feed on another of the computers. For instance, FIG. 4 shows a situation in which Alice's model feed, which is on Alice's computer, references Tom's model feed, which is on Tom's computer. In some embodiments, a model feed on one computer is a child (branch) of another model feed. In some embodiments, two model feeds on different computers each refer to the same snapshot feed. In some embodiments, a model feed is merged in that it includes incremental differences from at least two other model feeds.

In some embodiments, model feeds 202 on different computers arise from a single shared feed stream 204, such as a single RSS or Atom stream. For example, feeds on several developer computers may connect to a feed stream on a central server computer. Each machine could maintain and serve its own feed(s), particularly when supporting real-time collaboration, and still have the ability to publish to a central feed 202 server; the local versions are cached, with the server version being definitive.

Each of the foregoing situations described as having model feeds on different computers can also occur in some embodiments with model feeds on the same computer. For instance, a model feed on a computer may be a child of another model feed on that same computer, and so on.

In some embodiments, a model animation tool includes code 218 which is capable of applying an incremental difference forward or in reverse, that is, capable of doing or undoing a change specified by the incremental difference. Some embodiments only apply differences in a forward direction. The code 218 of some embodiments is also capable of updating a displayed model diagram 220 to show the applied incremental difference. These steps may be repeated with additional incremental difference(s).

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Methods

Figure 3:
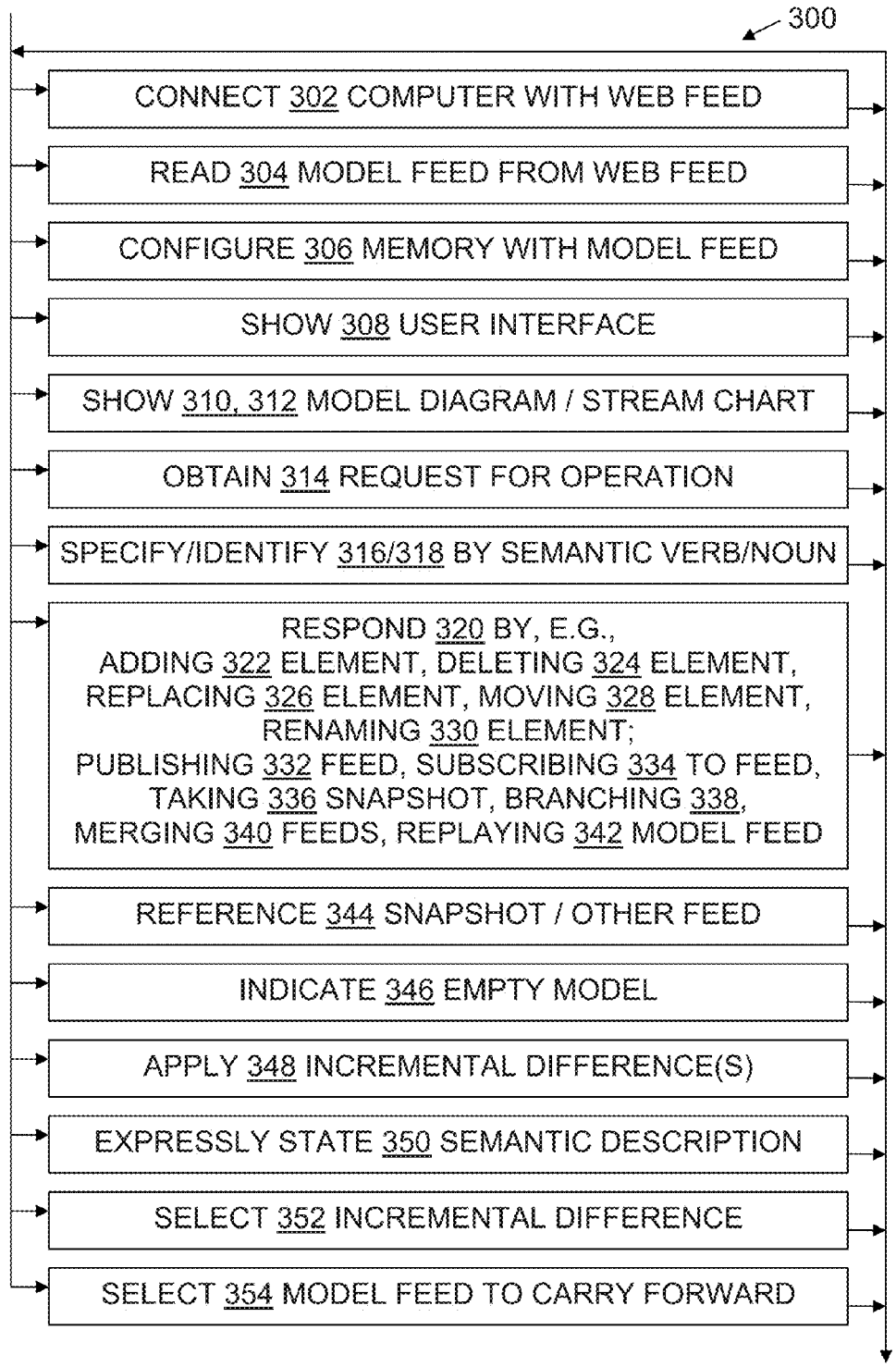
FIG. 3 is a flow chart illustrating steps of some method and configured storage medium embodiments.

FIG. 3 illustrates some method embodiments in a flowchart 300. Methods shown in the Figures may be performed in some embodiments automatically, e.g., by an IDE 126 modified to download and process model feed(s), or by a stand-alone feed reader 132 and tool code 218 under control of a script requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a connecting step 302, an embodiment connects a computer 102 with a web feed, such as an RSS feed or an Atom feed, that has been configured to supply incremental differences 208.

During a reading step 304, at least one incremental difference 208 of a model feed is read from a web feed connection, such as an RSS feed or an Atom feed.

Network transmissions, connections with feed readers, and reading from feed readers can be accomplished using familiar tools and techniques described in detail elsewhere. However, the content that is downloaded (e.g., incremental differences, base models, and other feed documents) and what happens to that content after it is downloaded proceeds as described herein.

During a memory configuring step 306, a memory medium 112 is configured by an incremental difference 208, base models such as a snapshot 228, or otherwise in connection with model versioning through web feeds as discussed herein.

During a showing step 308, a display shows a user interface 216. Step 308 and related steps may include showing 310 a model diagram 220 for particular version(s) of a model, showing 312 a stream chart 222 to illustrate the genealogy of the current version on display, and/or showing a menu or other GUI mechanism to obtain 314 from a user a selection of operation(s) 224 on diagram elements and/or model feeds. Steps 308-314 can be accomplished using familiar user interface mechanisms configured according to the teachings herein.

During a specifying step 316, an embodiment specifies an operation 224 at least in part by specifying a semantic verb, e.g., add, delete, move, rename, and so on. Semantic verbs 210 are specified at a high level when possible, to provide developers with more information about the purpose of an operation. For instance, rename might be implemented for efficiency, integrity, or other reasons by an element delete and an add of almost the same element, but describing the pair of operations as a rename carries more semantic information than describing it as an add and a delete.

During an identifying step 318, an embodiment specifies an operation 224 at least in part by identifying a semantic noun, e.g., class, method, other UML component, and so on. Semantic nouns 212 are specified at a high level when possible, to provide developers with more information about the purpose of an operation. For example, identifying a set as "elements connected to renamed element K" carries more information than simply listing the element IDs without noting the importance of the connection to element K.

During a responding step 320, code 218 and/or other aspects of an embodiment respond to a request for an operation. The response may be an error code, or may include performing, at least in part, the requested operation.

In particular, responding step 320 may include one or more of the following steps: adding 322 an element to a target element of a model feed, deleting 324 an element of a model feed, replacing 326 one element of a model feed with another element, moving 328 an element of a model feed, renaming 330 an element of a model feed. The foregoing are examples of element-based operations, which in some embodiments also cause corresponding visual changes in a model's diagram 220.

Responding step 320 may include one or more of the following model feed-based operations as steps: publishing 332 a model feed 202 so that others can subscribe to it, subscribing 334 to a model feed, taking 336 a snapshot of a model by capturing the model's current elements and relationships in a self-contained document, branching 338 a child from an existing model feed to create a new model feed for exploring alternatives without necessarily changing the parent feed, merging 340 two or more model feeds to form a new model feed based on incremental differences taken from multiple feeds, and replaying 342 a sequence (forward or in reverse) of incremental differences in a model feed.

During a referencing step 344, a model feed references a snapshot or references another model feed. FIG. 4 shows examples of each possibility: Alice's model feed references another model feed (Tom's), and Bob's model feed references a snapshot. Universal Resource Indicators (URIs) and/or other addressing mechanisms can be used to identify referenced items in a model feed.

During an indicating step 346, a model feed indicates an empty model as a starting point for a sequence 206 of incremental differences. A null value or other predetermined value can be used to identify the empty model.

During an applying step 348, code 218 applies an incremental difference 208 to a current version of a model. Familiar mechanisms within tools for performing model changes may used, modified to utilize semantic verbs, semantic nouns, documents 230, and other teachings herein.

During an express stating step 350, an embodiment expressly states a semantic description of an operation 224, e.g., by displaying descriptive text. Descriptions may recite semantic verbs and semantic nouns, and may include comments by developers. Descriptions may also include still or video records of model diagrams and/or stream charts.

During a selecting step 352, a developer selects an incremental difference 208 from one model feed to include (possibly in modified form) in another model feed. Selection may be accomplished using a stream chart, for example.

During a selecting step 354, a developer selects model feed to carry forward as the current model feed. Selection may be accomplished using a stream chart, for example.

The foregoing steps and their interrelationships are discussed in greater detail below, in connection with various embodiments.

Some embodiments provide a method utilizing a device which has a display, at least one logical processor, and a memory in operable communication with the logical processor and the display. The method includes the processor configuring 306 the memory with a model feed 202 which includes a sequence of incremental differences corresponding to respective model versions. The method also includes the display showing 310/312 a visual representation of the model feed and showing 308 a user interface, and obtaining 314 from a user through the user interface a requested operation 224 on the model feed. The method also includes responding 320 to the requested operation.

In some embodiments, the method responds 320 to the requested operation by at least one of the following steps: adding 322 an element E to a target element T of the model feed; deleting 324 a target element T of the model feed; replacing 326 a target element T of the model feed with an element E; moving 328 a target element T of the model feed to a target element P; renaming 330 a target element T of the model feed.

In some embodiments, at least one of the incremental differences 208 implicates at least one semantic verb 210 and also implicates at least one semantic noun 212 denoting a change from one model version to another model version. An incremental difference "implicates" a noun and a verb if the incremental difference (i) explicitly lists the noun and the verb to indicate how a change was made between two model versions, and/or (ii) implicitly shows the noun and the verb by showing the "before" and "after", namely, showing the model version before the noun and verb were applied and showing the model version after the noun and verb were applied. A sequence of incremental differences could explicitly list the changes made, or it could simply show the respective results of successive changes. In some embodiments, the semantic verb specifies at least one of the following: adding, deleting, replacing, moving, renaming; and the semantic noun identifies at least one of the following: a class, a method, a package, a state, a component, a UML element, an Interaction, a Lifeline, a Message, an Actor, a Use Case.

In one example scenario, User A adds a Class1 to the model, User A adds an Interface1 to the model, and User B creates an association between Class1 and Interface1. Semantic nouns then include Class1 and Interface1. Semantic verbs include adding a class, adding an interface, and creating an association. As another example, semantic nouns and semantic verbs may include Nodes and Links within Directed Graph Markup Language (DGML). Nodes can by typed via reference to something else, a code artifact, a document, and so on; a Link merely shows the relationship between Nodes.

In some embodiments, the requested operation 224 includes at least one of the following: publishing 332 a model feed 202; subscribing 334 to a model feed; taking 336 a snapshot of a model feed; branching 338 to create a child of a model feed; merging 340 model feeds; replaying 342 incremental differences in a model feed (animation). Publishing 332 can be done through the Atom Publishing Protocol, for example.

In some embodiments, the method includes a processor 110 configuring a memory medium 112 with a model feed 202 which includes a reference 214 to a model snapshot 228 feed 202. For example, in FIG. 4 Bob's model feed 202 includes a reference 214 to a feed 202 for model snapshot M5.

In some embodiments, the method includes a processor configuring a memory with a model feed 202 which includes a reference 214 to another model feed 202. For example, in FIG. 4 Alice's model feed 202 includes a reference 214 to Tom's model feed 202. More generally, in some embodiments the method obtains a model feed by connecting 302 to a computer 102 having an RSS feed or an Atom feed and then reading 304 incremental difference(s) 208 from that RSS or Atom feed, which thus performs as a model feed 202.

Some embodiments provide a method for model versioning using web feeds, including connecting 302 a computer to a web feed; reading 304 a model feed (sequence 206) from the web feed; configuring 306 a memory of the computer with the model feed, the model feed including the sequence of incremental differences corresponding to respective model versions; and obtaining 314 from a user a requested operation on the model feed. This particular embodiment does not require any steps using the display 120.

In some embodiments, the model feed includes a record indicating 346 an empty model, followed by the sequence 206 of incremental differences. In some embodiments, the model feed begins with the empty model and the method includes applying 348 the incremental differences in sequential order, which results in a sequence of syntactically valid model versions as each incremental difference is applied in turn.

In some embodiments, an incremental difference 208 includes a semantic description expressly stating 350 for users that the incremental difference does at least one of the following: replacing 326, moving 328, renaming 330. This particular list of operations is not comprehensive; another list may include adding 322 and deleting 324, for example. One approach is to include the semantic operations that are higher level and hence not adequately described in conventional tools. For instance, a replace can be viewed as a delete followed by an add, but it is more informative to say "replace" (when accurate) than it is to say "delete, add".

In some embodiments, the requested operation in the method includes selecting 352 an incremental difference in one model feed for inclusion in related form in another model feed. For example, FIG. 5 shows Bob's model feed including as Diff4 an element adding 322 incremental difference 208 which originated as Diff5 in Alice's model feed. Inclusion "in related form" covers (i) straight copying from one feed into another feed, and/or (ii) rename mapping like the FIG. 5 example in which Bob uses one of Alice's changes but also renames the component the change is applied to.

In some embodiments, the method includes reading 304 at least two different underlying model feeds 202 which represent different versions of a single model 122, and then selecting 352 specific versions of elements within the model to carry forward. The resultant feed is a user selection of elements within each underlying feed. In some embodiments, the method includes maintaining multiple options (e.g., with steps 302-350) and then selecting between them, using for instance step 352.

In some embodiments, the method includes referencing 344 a remote (network transmission required) individual element of a model 122 based on at least one local (local to the reference; no network transmission required) model feed 202 entry (incremental different 208) and at least one model feed snapshot 228. For example, in FIG. 4 Bob's model feed references another machine (e.g., a central server, or a peer) which holds snapshots, and in particular Bob's feed references individual element(s) of model feed snapshot M5. In some embodiments, one can reference an individual element (e.g. a single class) on a feed server through a combination of snapshots and feed entries. The feed 202 server may or may not understand the semantics of the model differences 208.

Configured Media

Some embodiments include a configured computer-readable storage medium 112. Medium 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory, which may be removable or not, and may be volatile or not, can be configured into an embodiment using items such as incremental differences 208, model feeds 202, stream charts 222, and tool code 218, in the form of data 118 and instructions 116, read from a removable medium 114 and/or another source such as a network connection, to form a configured medium. The configured medium 112 is capable of causing a computer system to perform method steps for transforming data through model versioning as disclosed herein. FIGS. 1 through 6 thus help illustrate configured storage media embodiments and method embodiments, as well as system and method embodiments. In particular, any of the method steps illustrated in FIG. 3, or otherwise taught herein, may be used to help configure a storage medium to form a configured medium embodiment.

ADDITIONAL EXAMPLES

Additional details and design considerations are provided below. As with the other examples herein, the features described may be used individually and/or in combination, or not at all, in a given embodiment.

In some embodiments, model versions are maintained as sequences 206 of diffs (incremental differences 208) in web feeds (e.g. Atom or RSS) or similar sequential content containers. Each user 104 can add new sequences of diffs as long as the result of applying all diffs in the sequence is a valid model. Users can create new feeds of diff sequences starting from any point in another feed 202, allowing for semantically meaningful branching 338. Merging 340 one or more feeds, even if they do not have a common base feed, is done using the semantics of the model, with the option to map or rename 330 elements from one feed into the other.

Some implementations include some or all of the following aspects: Model diffs in XMI or similar format; Semantic diff operations (or similar set), e.g., Create empty model, Add element e to target element t (from XMI), Delete target element t (from XMI), Replace target element t with element e (from XMI), Move target element t to target element p, Rename target element t with name n (special case of replace), Publish valid sequence of diffs, Any sequence starts with an empty model or a reference to another valid sequence, Use rename as mapping to merge feeds—with "merge memory" to safely combine feeds for ongoing collaborative modeling.

By way of example, FIG. 4 shows a model M, created by Tom, that is described by a record for an empty model followed by a sequence of diffs. Reading forward from the empty model to any of the records results in a valid model. A snapshot service can maintain a feed of snapshot models (e.g., snapshots M0, M2, M5, M6 shown) as a convenience for model viewers and other tool code 218. Alice creates a new alternate feed 202 of M that starts with the valid model after Diff 3. Bob has a different idea and creates another alternate feed 202 that starts with M's snapshot M5. Anyone else allowed to access the streams 204 could view (and possibly contribute to) the diff feeds and view the related models. After working for a while, Bob looks at Alice's feed and decides that he likes one of her changes. The change is an addition to a component that Alice has renamed, but Bob likes the existing name. As shown in FIG. 5, Bob can create a rename mapping record in his stream to indicate how to translate diffs that he chooses to bring over from Alice's feed. Bob then brings over one of Alice's diffs into his feed (Bob XDiff4<->Alice Diff5) and introduces another diff (Bob Diff 5) of his own. Alice, Bob or someone else could use the same capability to bring diffs from one or more of the alternative feeds into a main feed. More generally, the use of standard Web protocols such as RSS, Atom, HTTP, and HTML allow users to find and subscribe to each others' model feeds during collaboration.

Alternatives to some embodiments utilize approaches to model collaboration and versioning which rely strongly or entirely on opaque files under version control and repositories built on database software. Although it is known for tools to support finding differences between two models, the intent and order of changes is lost to the person examining the difference; familiar diff tools have only limited semantic awareness. By contrast, embodiments described herein provide feed-based versions of models, which supports exploration of modeling alternatives (branching) and collapsing alternatives (merging). Developers, including those who view themselves primarily as modelers, can accept or reject semantically meaningful changes from other modelers' feeds in sensible chunks.

As illustrated in FIG. 4, for example, the path taken by a developer Alice, or Tom, or Bob, is captured in the sequence 206 of incremental differences 208. Moreover, those differences (indicated in FIG. 4, e.g., by '+' add, '−' delete, 'R' replace, 'N' rename, 'M' move) can be incorporated from one version into the path defining another version. At any point in time, a user with the right permissions could look at any of the feeds 202 and decide to publish diffs from one feed in another feed, provided that the consequences of applying the diffs maintain referential integrity in the target feed. This constraint can be made less restrictive by allowing remapping of IDs over the same type. This relaxation would allow two developers to make similar changes and then bring diffs back together later, as illustrated in FIG. 5 by use of mapping to support ongoing "memory merge".

As another example, assume a developer (architect) A creates a new UML Component diagram 220, as shown in FIG. 6. In some embodiments, the diagram would be serialized in XMI as:

```
<xmi:XMI xmlns:UML="http://schema.omg.org/spec/UML/2.2"
    xmlns:xmi="http://schema.omg.org/spec/XMI/2.1">
  <UML:Model name="My Components" xmi:id="model1"
xmi:uuid="0000:0001">
    <ownedElement xmi:type="UML:Component" name="Model"
xmi:id="component1"
        xmi:uuid="000:0002">
      <provided xmi:type="UML:Interface" name="IModel"
xmi:id="interface1"
        xmi:uuid="0000:0005" />
    </ownedElement>
```

-continued

```
    <ownedElement xmi:type="UML:Component" name="View"
xmi:id="component2"
        xmi:uuid="000:0003">
      <provided xmi:type="UML:Interface" name="IView"
xmi:id="interface2"
        xmi:uuid="0000:0006" />
      <required xmi:type="UML:Interface" name="IModel"
xmi:id="interface4"
        xmi:uuid="0000:0007" />
    </ownedElement>
    <ownedElement xmi:type="UML:Component" name="Controller"
        xmi:id="component3" xmi:uuid="000:0004">
      <provided xmi:type="UML:Interface" name="IDo"
xmi:id="interface3"
        xmi:uuid="0000:0007" />
      <required xmi:type="UML:Interface" name="IModel"
xmi:id="interface5"
        xmi:uuid="0000:0008" />
      <required xmi:type="UML:Interface" name="IView"
xmi:id="interface6"
        xmi:uuid="0000:0009" />
    </ownedElement>
    <ownedElement xmi:type="UML:Connector"
kind="UML:ConnectorKind:assembly"
        xmi:id="connector1" xmi:uuid="0000:000A">
      <end xmi:idref="interface4" />
      <end xmi:idref="interface1" />
    </ownedElement>
    <ownedElement xmi:type="UML:Connector"
kind="UML:ConnectorKind:assembly"
        xmi:id="connector2" xmi:uuid="0000:000B">
      <end xmi:idref="interface5" />
      <end xmi:idref="interface1" />
    </ownedElement>
    <ownedElement xmi:type="UML:Connector"
kind="UML:ConnectorKind:assembly"
        xmi:id="connector3" xmi:uuid="0000:000C">
      <end xmi:idref="interface6" />
      <end xmi:idref="interface2" />
    </ownedElement>
  </UML:Model>
</xmi:XMI>
```

In some embodiments, the XMI document 230 above would be part of a snapshot 228 feed 202 constructed from the differences that might also use FeedSync synchronization for whole file versioning; see the specification online at dev dot live dot com slash feedsync slash spec slash spec dot aspx. The FeedSync FAQ explains: "Just as RSS and Atom enable the aggregation of information from a variety of data sources, FeedSync enables the synchronization of information across a variety of data sources. Data sources that implement FeedSync will be able to exchange and synchronize data with any other data source that also implements FeedSync." In some embodiments, each diff feed resembles a normal Atom (or RSS 2) feed, but the first entry contains, as shown below, or refers 344 to, a document 230. A reference 214 can be to a particular document snapshot from a snapshot feed. Alternatively, the first entry in the diff feed 202 could be a reference 214 to another diff feed, including the time at which the referring feed branched off the referenced feed.

Below is an example diff feed that represents the construction, in three steps, of the model described by the XMI document 230 above. A base document and each diff are maintained as content in their entries. One could also reference each XMI file as a separate document, or one could mix these approaches.

```
<?xml version="1.0" encoding="utf-8"?>
<feed xmlns="http://www.w3.org/2005/Atom">
  <title>My Components</title>
  <link href="http://example.org/My_Components"/>
```

-continued

```
    <updated>2009-03-13T18:30:02Z</updated>
    <author>
        <name>John Doe</name>
    </author>
    <id>urn:uuid:60a76c80-d399-11d9-b93C-0003939e0af6</id>
```

In practice, the XMI document would not have explanatory comments such as this one interspersed, but this is a patent document which extends beyond XMI. The Base Model defined in the following portion of the XMI document indicates 346 an empty model as the starting point of a sequence 206.

```
    <entry>
        <title>Base Model for feed</title>
        <link href="http://example.org/My_Components/2009/03/12/model"/>
        <id>urn:uuid:1225c695-cfb8-4ebb-aaaa-80da344efa6a</id>
        <updated>2009-03-12T14:30:01Z</updated>
        <summary>Empty model</summary>
        <content type="xml" xml:lang="en">
            <xmi:XMI xmlns:UML="http://schema.omg.org/spec/UML/2.2"
                xmlns:xmi="http://schema.omg.org/spec/XMI/2.1">
                <UML:Model name="My Components" xmi:id="model1" xmi:uuid="0000:0001"
                />
            </xmi:XMI>
        </content>
    </entry>
```

The next portion of the XMI document defines an entry for incremental differences 208 that add the Model, View, and Component elements shown in FIG. 6 to the empty model indicated above.

```
    <entry>
        <title>My Components 1</title>
        <link href="http://example.org/My_Components/2009/03/12/diff1"/>
        <id>urn:uuid:1225c695-cfb8-4ebb-aaaa-80da344efa6b</id>
        <updated>2009-03-12T14:30:02Z</updated>
        <summary>Components</summary>
        <content type="xml" xml:lang="en">
            <xmi:XMI xmlns:UML="http://schema.omg.org/spec/UML/2.2"
                xmlns:xmi="http://schema.omg.org/spec/XMI/2.1">
                <difference xmi:type="xmi:Add" addition="component1">
                    <target href="model.xml#model1"/>
                </difference>
                <difference xmi:type="xmi:Add" addition="component2">
                    <target href="model.xml#model1"/>
                </difference>
                <difference xmi:type="xmi:Add" addition="component3">
                    <target href="model.xml#model1"/>
                </difference>
                <ownedElement xmi:type="UML:Component" name="Model"
                    xmi:id="component1" xmi:uuid="000:0002" />
                <ownedElement xmi:type="UML:Component" name="View"
                    xmi:id="component2" xmi:uuid="000:0003" />
                <ownedElement xmi:type="UML:Component" name="Controller"
                    xmi:id="component3" xmi:uuid="000:0004" />
            </xmi:XMI>
        </content>
    </entry>
```

The next portion of the XMI document defines an entry for incremental differences 208 that add the IModel, IView, and IDo elements shown in FIG. 6 to the model.

```
    <entry>
        <title>My Components 2</title>
        <link href="http://example.org/My_Components/2009/03/12/diff2"/>
        <id>urn:uuid:1225c695-cfb8-4ebb-aaaa-80da344efa6c</id>
        <updated>2009-03-12T18:30:02Z</updated>
        <summary>Added interfaces</summary>
        <content type="xml" xml:lang="en">
            <xmi:XMI xmlns:UML="http://schema.omg.org/spec/UML/2.2"
                xmlns:xmi="http://schema.omg.org/spec/XMI/2.1">
                <difference xmi:type="xmi:Add" addition="interface1">
                    <target href="model.xml#component1"/>
                </difference>
                <difference xmi:type="xmi:Add" addition="interface2">
                    <target href="model.xml#component2"/>
                </difference>
                <difference xmi:type="xmi:Add" addition="interface3">
                    <target href="model.xml#component3"/>
                </difference>
                <difference xmi:type="xmi:Add" addition="interface4">
                    <target href="model.xml#component2"/>
                </difference>
                <difference xmi:type="xmi:Add" addition="interface5">
                    <target href="model.xml#component3"/>
                </difference>
                <difference xmi:type="xmi:Add" addition="interface6">
                    <target href="model.xml#component3"/>
                </difference>
                <provided xmi:type="UML:Interface" name="IModel"
                    xmi:id="interface1" xmi:uuid="0000:0005" />
                <provided xmi:type="UML:Interface" name="IView"
                    xmi:id="interface2" xmi:uuid="0000:0006" />
                <required xmi:type="UML:Interface" name="IModel"
                    xmi:id="interface4" xmi:uuid="0000:0007" />
                <provided xmi:type="UML:Interface" name="IDo"
                    xmi:id="interface3" xmi:uuid="0000:0007" />
                <required xmi:type="UML:Interface" name="IModel"
                    xmi:id="interface5" xmi:uuid="0000:0008" />
                <required xmi:type="UML:Interface" name="IView"
                    xmi:id="interface6" xmi:uuid="0000:0009" />
            </xmi:XMI>
        </content>
    </entry>
```

The final portion of the XMI document defines an entry for incremental differences 208 that add connectors to the model.

```
    <entry>
        <title>My Components 3</title>
        <link href="http://example.org/My_Components/2009/03/12/diff3"/>
        <id>urn:uuid:1225c695-cfb8-4ebb-aaaa-80da344efa6d</id>
        <updated>2009-03-13T18:30:02Z</updated>
        <summary>Added connections</summary>
        <content type="xml" xml:lang="en">
            <xmi:XMI xmlns:UML="http://schema.omg.org/spec/UML/2.2"
                xmlns:xmi="http://schema.omg.org/spec/XMI/2.1">
```

-continued

```
        <difference xmi:type="xmi:Add"
addition="connector1">
            <target href="model.xml#model1"/>
        </difference>
        <difference xmi:type="xmi:Add"
addition="connector2">
            <target href="model.xml#model1"/>
        </difference>
        <difference xmi:type="xmi:Add"
addition="connector3">
            <target href="model.xml#model1"/>
        </difference>
        <ownedElement xmi:type="UML:Connector"
            kind="UML:ConnectorKind:assembly"
xmi:id="connector1"
            xmi:uuid="0000:000A">
            <end xmi:idref="interface4" />
            <end xmi:idref="interface1" />
        </ownedElement>
        <ownedElement xmi:type="UML:Connector"
            kind="UML:ConnectorKind:assembly"
xmi:id="connector2"
            xmi:uuid="0000:000B">
            <end xmi:idref="interface5" />
            <end xmi:idref="interface1" />
        </ownedElement>
        <ownedElement xmi:type="UML:Connector"
            kind="UML:ConnectorKind:assembly"
xmi:id="connector3"
            xmi:uuid="0000:000C">
            <end xmi:idref="interface6" />
            <end xmi:idref="interface2" />
        </ownedElement>
    </xmi:XMI>
  </content>
 </entry>
</feed>
```

Conclusion

Although particular embodiments are expressly illustrated and described herein as methods, as configured media, or as systems, it will be appreciated that discussion of one type of embodiment also generally extends to other embodiment types. For instance, the descriptions of methods in connection with FIG. 3 also help describe configured media, and help describe the operation of systems and manufactures like those discussed in connection with other Figures. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method utilizing a device which has a display, at least one logical processor, and a memory in operable communication with the logical processor and the display, the method comprising the steps of:

the processor configuring the memory with a Unified Modeling Language (UML) model feed, wherein the UML model feed differs from a web feed which is not a UML model feed at least in that the UML model feed includes a sequence of incremental differences corresponding to respective model versions, each model version being part of a model, the model being captured in a tangible form and also being a description defined in at least UML modeling language, each modeling language of the UML model feed being an artificial language used to express model information in a model structure having components, the model structure defined by a set of modeling language rules which guide interpretation of the model structure's components;

the display showing a visual representation of the UML model feed and showing a user interface;

obtaining from a user through the user interface a requested operation on the UML model feed; and responding to the requested operation by at least one of the following steps:

adding an element E to a target element T of the model feed;

deleting a target element T of the model feed;

replacing a target element T of the model feed with an element E;

moving a target element T of the model feed to a target element P;

renaming a target element T of the model feed.

2. The method of claim 1, wherein the method comprises responding to the requested operation by at least one of the following steps:

replacing a target element T of the model feed with an element E;

moving a target element T of the model feed to a target element P;

renaming a target element T of the model feed.

3. The method of claim 1, wherein:

at least one of the incremental differences implicates at least one semantic verb and also implicates at least one semantic noun denoting a change from one model version to another model version;
the semantic verb specifies at least one of the following: adding, deleting, replacing, moving, renaming; and
the semantic noun identifies at least one of the following: a class, a method, a package, a state, a component.

4. The method of claim 1, wherein the requested operation includes at least one of the following:
publishing a model feed;
subscribing to a model feed;
taking a snapshot of a model feed;
branching to create a child of a model feed;
merging model feeds;
replaying incremental differences in a model feed.

5. The method of claim 1, wherein the method comprises the processor configuring the memory with a model feed which includes a reference to a model snapshot feed.

6. The method of claim 1, wherein the method comprises the processor configuring the memory with a model feed which includes a reference to another model feed.

7. The method of claim 1, wherein the method further comprises obtaining the model feed using at least one of the following: an RSS feed, an Atom feed.

8. A computer system comprising:
a logical processor;
a memory in operable communication with the logical processor;
a Unified Modeling Language (UML) model feed residing in the memory and differing from a web feed which is not a UML model feed at least in that the UML model feed has a sequence of incremental differences corresponding to respective model versions, each model version being part of a model, the model being captured in a tangible form and also being a description defined in at least one modeling language which includes UML, each modeling language of the UML model feed being an artificial language used to express model information in a model structure having components, the model structure defined by a set of modeling language rules which guide interpretation of the model structure's components; and
a display configured with a model diagram visually representing elements with their relationships and/or dependencies in at least one of the model versions, wherein the display is further configured with a stream chart visually representing individual incremental differences in at least two model feeds and also visually representing at least one reference in one model feed to another model feed.

9. The system of claim 8, further comprising a model snapshot feed including an XMI document representing a snapshot of at least one of the model versions.

10. The system of claim 8, wherein:
the system comprises a plurality of computers;
each computer has a logical processor and also has a memory that is in operable communication with the logical processor and is configured by a model feed including a sequence of incremental differences corresponding to respective model versions; and
the model feed on at least one of the computers references the model feed on another of the computers.

11. The system of claim 8, wherein:
the system comprises a plurality of computers;
each computer has a logical processor and also has a memory that is in operable communication with the logical processor and is configured by a model feed including a sequence of incremental differences corresponding to respective model versions; and
at least one of the following conditions is met for model feeds on at least two different computers:
one model feed is a child of another model feed;
two model feeds each refer to the same snapshot feed;
one model feed is merged in that it includes incremental differences from at least two other model feeds.

12. The system of claim 8, wherein:
the system comprises a plurality of computers;
each computer has a logical processor and also has a memory that is in operable communication with the logical processor and is configured by a model feed including a sequence of incremental differences corresponding to respective model versions; and
at least two of the model feeds on different computers arise from a single shared feed stream.

13. The system of claim 8, further comprising a model animation tool which is capable of:
(a) applying an incremental difference in at least one direction (forward, reverse),
(b) updating the displayed model diagram to show the applied incremental difference, and
repeating (a) and (b) with one or more additional incremental differences.

14. A computer-readable storage medium configured with data and with instructions that when executed by at least one processor causes the at least one processor to perform a method for model versioning using web feeds, the method comprising the steps of:
connecting a computer to a web feed;
reading a Unified Modeling Language (UML) model feed from the web feed;
configuring a memory of the computer with the model feed, the UML model feed including a sequence of incremental differences corresponding to respective model versions, each model version being part of a model, the model being captured in a tangible form and also being a description defined in at least one modeling language which includes UML, each modeling language being an artificial language used to express model information in a model structure having components, the model structure defined by a set of modeling language rules which guide interpretation of the model structure's components;
obtaining from a user a requested operation on the model feed; and
configuring a display of the computer with a stream chart visually representing individual incremental differences in at least two model feeds and also visually representing at least one reference in one model feed to another model feed.

15. The configured medium of claim 14, wherein:
the model feed includes a record indicating an empty model, followed by the sequence of incremental differences; and
beginning with the empty model and then applying the incremental differences in sequential order results in a sequence of syntactically valid model versions as each incremental difference is applied in turn.

16. The configured medium of claim 14, wherein an incremental difference includes a semantic description expressly stating for users that the incremental difference does at least one of the following: replacing, moving, renaming.

17. The configured medium of claim 14, wherein the requested operation method includes selecting an incremental difference in one model feed for inclusion in related form in another model feed.

18. The configured medium of claim 14, wherein the method comprises reading at least two different model feeds which represent different versions of a single model, and then selecting specific versions of elements within the model to carry forward.

19. The configured medium of claim 14, wherein the method comprises referencing a remote individual element of a model based on at least one local model feed entry and at least one model feed snapshot.

20. The configured medium of claim 14, wherein the method further comprises reading the UML model feed using at least one of the following: an RSS feed, an Atom feed.

* * * * *